UNITED STATES PATENT OFFICE.

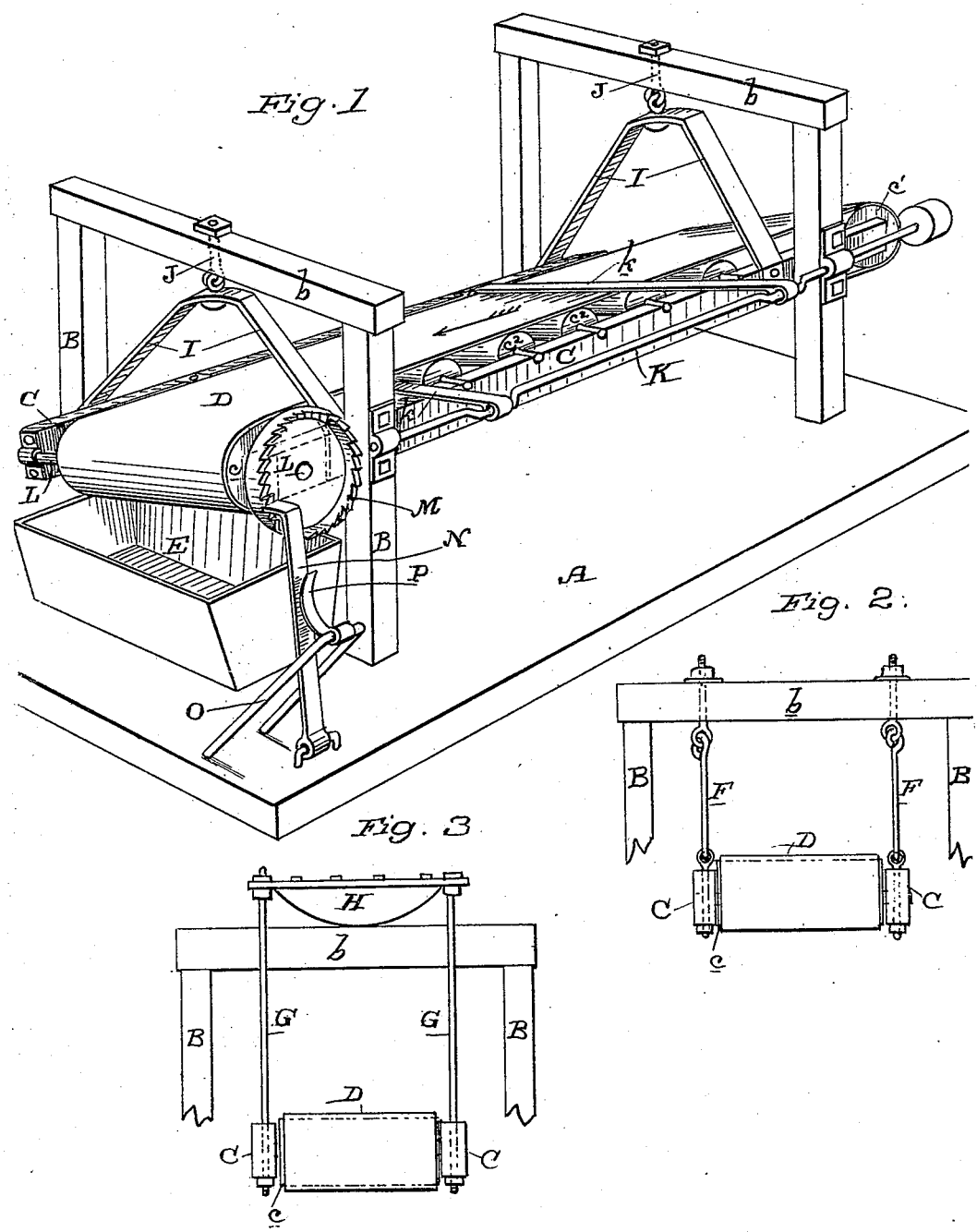

JAMES TULLOCH, OF ANGEL'S CAMP, CALIFORNIA.

CONCENTRATOR.

SPECIFICATION forming part of Letters Patent No. 471,319, dated March 22, 1892.

Application filed August 12, 1891. Serial No. 402,474. (No model.)

*To all whom it may concern:*

Be it known that I, JAMES TULLOCH, a citizen of the United States, residing at Angel's Camp, Calaveras county, State of California, have invented an Improvement in Concentrators; and I hereby declare the following to be a full, clear, and exact description of the same.

My invention relates to that class of ore-concentrators in which is employed an endless traveling belt or table mounted at an inclination upon a suitable swinging frame, the ore-pulp with water being fed upon the belt or table, whereby the lighter and worthless particles are washed down with the stream to the lower end, while the heavier and precious particles clinging to the surface are carried upwardly and are washed off in a suitable tank below.

My invention consists in certain improvements in this class of concentrators. These improvements consist in suspending the endless traveling belt or table from above by suitable swinging connections and in imparting to said belt or table a reciprocating movement, whereby its surface describes a concave arc; also, in a novel means, hereinafter described, of suspending said belt or table; also, in a novel mechanism for effecting what is known as the "uphill travel" of said belt or table.

The improvements will be hereinafter fully described, and specifically pointed out in the claims.

The prime object of my invention is to so arrange the endless belt or table that every point in its surface may describe a concave arc in swinging to and fro in contradistinction to the convex arc which said belts or tables have heretofore described by reason of being mounted upon yielding standards below. This motion is advantageous in better spreading the material over the surface of the belt and in keeping it worked away from the sides thereof and toward the center, resulting in a more perfect concentration.

Another object is to provide a simple and effective means of imparting an uphill travel to the belt or table.

Referring to the accompanying drawings for a more complete explanation of my invention, Figure 1 is a perspective view of my ore-concentrator. Figs. 2 and 3 show modifications in the means of suspending the shaking belt-carrying frame.

A is the bed-plate of my concentrator, from which the standards B rise, said standards being provided with top bars $b$.

C is the shaking frame of the machine, having a head-drum $c$, a tail-drum $c'$, and intervening supporting-rollers $c^2$. Upon these drums and rollers is mounted and adapted to travel the endless belt or table D, made of any suitable material—canvas, rubber, blanket, or other material usually employed in this class of machines.

E is a washing-tank under the head of the belt. The frame C is mounted at an inclination, so that the belt is likewise inclined, and has an uphill travel, as indicated by the arrow.

My first improvement in this class of machines consists in suspending the belt or table from above by a swinging connection, so that in reciprocating or shaking it every point in its surface shall describe a concave arc.

Various devices may be employed to effect the proper suspension of the belt or table from above. Thus, as shown in Fig. 2, it may be suspended by means of four or more pivotally or loosely connected hangers F, suspended from the cross or top bars $b$ of the standards B, or, as shown in Fig. 3, it may be suspended by means of upwardly-extending arms G, connected at their lower ends with the belt-carrying frame C, and having secured between their upper ends rockers H, which are adapted to bear and rock upon the top bars $b$ of the standards B; but the particular means which I prefer, and which are shown in Fig. 1, consist of inclined arms I, secured at each side of the frame C near each end thereof, and said arms extending upwardly to and under the middles of the top bars $b$, to which they are freely hung by means of a link-bolt or jointed rod J or other means in the centers of the top bars, so that the belt or table is suspended centrally from above. All of these means provide for a swinging of the belt or table through a concave arc.

Any suitable means may be employed to effect the vibration of the table, and I have here shown for this purpose the crank-shaft K and connecting-links $k$. Now it will be seen that by rotating the crank-shaft the belt or table is vibrated about its points of support above and every point in its surface describes a concave arc, resulting in spreading the material upon the surface of the belt or table more generally and equally and in keeping it from packing upon the sides, directing it toward the center.

In order to effect the uphill travel of the belt, I have mounted on the end of the shaft L of the head-drum $c$ a ratchet M.

Connected with the base frame or plate A by a hinge or loose joint is an actuating-pawl N, directed by a suitable guide O, and having its upper end adapted to engage the teeth of the ratchet M. This pawl may be a gravity one, or to insure its perfect action may have a spring P behind it, holding it positively to its engagement. Now as the table swings toward the pawl the ratchet is brought into contact at each return stroke with the pawl, and as said ratchet swings through its upward movement it is turned one tooth at a time by its engagement with the pawl. This engagement of pawl and ratchet and the direct connection of the latter with the shaft of the head-drum makes a simpler device than those shown in my previous patents, No. 412,434, dated October 8, 1889, and No. 443,171, dated December 23, 1890.

Having thus described my invention, what I claim as new, and desire to secure by Letters Patent, is—

1. In an ore-concentrator, the belt-carrying frame, the endless traveling belt mounted thereon, and connections for vibrating said frame and belt, in combination with upwardly-extending arms connected at their lower ends with the belt-carrying frame and freely connected at their upper ends to stationary bars at points in the longitudinal center of the belt, substantially as herein described.

2. In an ore-concentrator, the combination of the bed-plate, the standards with top bars, the belt-carrying frame, the endless belt thereon, the arms secured to said belt-carrying frame, the swinging connections between the upper ends of said arms and the middles of the cross-bars, the crank-shaft, and the links connecting said crank-shaft with the belt-carrying frame, substantially as herein described.

In witness whereof I have hereunto set my hand.

JAMES TULLOCH.

Witnesses:
JOHN B. MEYERS,
JACOB CASTER.